United States Patent
Ren et al.

(10) Patent No.: US 10,782,041 B2
(45) Date of Patent: Sep. 22, 2020

(54) MULTI-TYPE AIR CONDITIONING SYSTEM AND ANTI-COLD-AIR CONTROL METHOD AND APPARATUS OF INDOOR UNIT THEREOF

(71) Applicants: GD MIDEA HEATING & VENTILATING EQUIPMENT CO., LTD., Foshan (CN); MIDEA GROUP CO., LTD., Foshan (CN)

(72) Inventors: Linxing Ren, Foshan (CN); Yongfeng Xu, Foshan (CN); Guozhong Yang, Foshan (CN); Mingren Wang, Foshan (CN); Meibing Xiong, Foshan (CN); Xihua Ma, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 149 days.

(21) Appl. No.: 15/963,941

(22) Filed: Apr. 26, 2018

(65) Prior Publication Data
US 2018/0283721 A1    Oct. 4, 2018

Related U.S. Application Data

(63) Continuation of application No. PCT/CN2017/101584, filed on Sep. 13, 2017.

(30) Foreign Application Priority Data

Jan. 17, 2017   (CN) .......................... 2017 1 0031500

(51) Int. Cl.
*F24F 11/49*   (2018.01)
*F24F 11/74*   (2018.01)
(Continued)

(52) U.S. Cl.
CPC .............. *F24F 11/49* (2018.01); *F24F 11/30* (2018.01); *F24F 11/65* (2018.01); *F24F 11/74* (2018.01); *F24F 11/79* (2018.01); *F24F 2110/10* (2018.01)

(58) Field of Classification Search
CPC ............. F24F 11/49; F24F 11/74; F24F 11/65
See application file for complete search history.

(56) References Cited

U.S. PATENT DOCUMENTS

2004/0050077 A1*   3/2004  Kasai ..................... F24F 1/0011
                                                      62/186

FOREIGN PATENT DOCUMENTS

CN    102356283 A    2/2012
CN    102829531 A    12/2012
(Continued)

OTHER PUBLICATIONS

Dewei, Heating start method of multi-split air conditioner, Nov. 2014, Full Document (Year: 2014).*
(Continued)

*Primary Examiner* — Elizabeth J Martin
*Assistant Examiner* — Nael N Babaa
(74) *Attorney, Agent, or Firm* — Morgan, Lewis & Bockius LLP

(57) ABSTRACT

It is provided a cold-air-avoidance control method and apparatus of an indoor unit of a multi-split air conditioning system, the multi-split air conditioning system includes an outdoor unit and a plurality of indoor units, and the cold-air-avoidance control method includes: obtaining a saturation temperature corresponding to a high pressure of the outdoor unit; obtaining an entrance temperature and a return air temperature of a heat exchanger of each heating indoor unit, and controlling an operating status of the heating indoor unit according to the saturation temperature, the
(Continued)

entrance temperature and the return air temperature. With the method according to the present disclosure, reliability and accuracy of controlling the heating indoor unit can be improved, such that the effect of the cold-air-avoidance control is improved, and a more comfortable heating process is provided.

8 Claims, 2 Drawing Sheets

(51) Int. Cl.
    *F24F 11/65*     (2018.01)
    *F24F 11/30*     (2018.01)
    *F24F 11/79*     (2018.01)
    *F24F 110/10*     (2018.01)

(56) References Cited

FOREIGN PATENT DOCUMENTS

| CN | 102901181 A | | 1/2013 |
|---|---|---|---|
| CN | 103017294 A | * | 4/2013 |
| CN | 103017294 A | | 4/2013 |
| CN | 103017294 B | * | 11/2014 |
| CN | 105890118 A | * | 8/2016 |
| CN | 105890118 A | | 8/2016 |
| CN | 106288246 A | | 1/2017 |
| CN | 106813360 A | | 6/2017 |
| KR | 20040034141 A | | 4/2004 |

OTHER PUBLICATIONS

Deng, Method for improving heating effect of multi-connected machine indoor machines and unit thereof, 2016, Full Document (Year: 2016).*
Cheng, Heating start method of multi-split air conditioner, 2013, Full Document (Year: 2013).*
Guandong Midea HVAC Equipment Co., Ltd., Second Office Action, CN201710031500.5, dated Oct. 14, 2019, 33 pgs.
Midea, International Search Report and Written Opinion, PCT/CN2017/101584, dated Dec. 22, 2017, 15 pgs.
Guandong Midea HVAC Equipment Co., Ltd., First Office Action, CN201710031500.5, dated Feb. 28, 2019, 30 pgs.

* cited by examiner

MULTI-TYPE AIR CONDITIONING SYSTEM AND ANTI-COLD-AIR CONTROL METHOD AND APPARATUS OF INDOOR UNIT THEREOF

RELATED APPLICATIONS

This application is a continuation application of PCT Patent Application No. PCT/CN2017/101584, entitled "MULTI-TYPE AIR CONDITIONING SYSTEM AND ANTI-COLD-AIR CONTROL METHOD AND APPARATUS OF INDOOR UNIT THEREOF" filed on Sep. 13, 2017, which claims priority to Chinese Patent Application No. 201710031500.5, filed with the Chinese Patent Office on Jan. 17, 2017, and entitled "MULTI-TYPE AIR CONDITIONING SYSTEM AND ANTI-COLD-AIR CONTROL METHOD AND APPARATUS OF INDOOR UNIT THEREOF", both of which are incorporated herein by reference in their entirety.

TECHNICAL FIELD

The present disclosure relates to a field of multi-split air conditioning system technology, and more particularly, to a cold-air-avoidance control method of an indoor unit of a multi-split air conditioning system, a cold-air-avoidance control apparatus of an indoor unit of a multi-split air conditioning system, and a multi-split air conditioning system.

BACKGROUND

When an indoor unit is turned on in a heating mode, there is usually a cold-air-avoidance control process for a fan to prevent the indoor unit from blowing cold air. Currently, the cold-air-avoidance control of the indoor unit is generally realized by controlling the fan to operate according to a temperature at central part of an indoor evaporator. But with the above method, not only a temperature sensor has to be added at the central part of the indoor evaporator, thus increasing a cost, but control reliability and accuracy are also unsatisfied, therefore an effect of the cold-air-avoidance control cannot be guaranteed.

SUMMARY

The present disclosure aims to solve at least one of the technical problems existing in the related art to at least some extent. Accordingly, an objective of the present disclosure is to provide a cold-air-avoidance control method of an indoor unit of a multi-split air conditioning system, so as to increase the reliability and accuracy of controlling the heating indoor unit (the indoor unit is in a heating mode), improve the effect of the cold-air-avoidance control, and provide a more comfortable heating process.

A second objective of the present disclosure is to provide a cold-air-avoidance control apparatus of an indoor unit of a multi-split air conditioning system.

A third objective of the present disclosure is to provide a multi-split air conditioning system.

To achieve the above objectives, embodiments according to a first aspect of the present disclosure provide a cold-air-avoidance control method of an indoor unit of a multi-split air conditioning system, in which the multi-split air conditioning system comprises an outdoor unit and a plurality of indoor units, the method includes: obtaining a saturation temperature corresponding to a high pressure of the outdoor unit; obtaining an entrance temperature and a return air temperature of a heat exchanger of each heating indoor unit, and controlling an operating status of the heating indoor unit according to the saturation temperature, the entrance temperature and the return air temperature.

With the cold-air-avoidance control method of an indoor unit of a multi-split air conditioning system according to embodiments of the present disclosure, the saturation temperature corresponding to the high pressure of the outdoor unit, the entrance temperature and the return air temperature of the heat exchanger of each heating indoor unit are obtained, the operating status of each heating indoor unit is controlled according to the above temperatures, thus increasing reliability and accuracy of controlling the heating indoor unit, improving the effect of the cold-air-avoidance control, and providing a more comfortable heating process.

Moreover, the cold-air-avoidance control method of an indoor unit of a multi-split air conditioning system according to above embodiments of the present disclosure may have the following additional technical features.

Specifically, the operating status of the heating indoor unit includes a first operating status, a second operating status and a third operating status. In the first operating status, a fan of the heating indoor unit is shut off; in the second operating status, the fan of the heating indoor unit operates at a first wind level, and an angle of an air outlet of the heating indoor unit is adjusted to an angle corresponding to a lower limit value of a size of the air outlet, in which a rotation rate of the fan corresponding to the first wind level is a minimal value of a plurality of rotation rates corresponding respectively to a plurality of wind levels; and in the third operating status, the fan of the heating indoor unit operates in a preset wind level, and the angle of the air outlet of the heating indoor unit is adjusted to a preset angle.

Further, the method of controlling an operating status of the heating indoor unit according to the saturation temperature, the entrance temperature and the return air temperature includes: controlling the heating indoor unit to switch the operating status according to the saturation temperature, the entrance temperature, the return air temperature and a duration of a current operating status of the heating indoor unit.

Specifically, the method of controlling the operating status of the heating indoor unit to switch according to the saturation temperature, the entrance temperature, the return air temperature and a duration of a current operating status of the heating indoor unit includes: when the heating indoor unit is in the first operating status, if the heating indoor unit operates in the first operating status for a duration greater than or equal to a first time period, or the entrance temperature is higher than or equal to a first temperature threshold, or the saturation temperature is higher than or equal to a second temperature threshold, switching the operating status of the heating indoor unit to the second operating status; when the heating indoor unit is in the second operating status, if the heating indoor unit operates in the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, switch the operating status of the heating indoor unit to the third operating status; if the heating indoor unit operates in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, switching the operating status of the heating indoor unit to the first operating status; when the heating indoor unit is in the third operating status, if the heating indoor unit operates in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, switching the operating status of the heating indoor unit to the second operating status.

To achieve the above objectives, embodiments according to a second aspect of the present disclosure provide a cold-air-avoidance control apparatus of an indoor unit of a multi-split air conditioning system, in which, the multi-split air conditioning system comprises an outdoor unit and a plurality of indoor units, and the cold-air-avoidance control apparatus includes: a first obtaining module configured to obtain a saturation temperature corresponding to a high pressure of the outdoor unit; a second obtaining module configured to obtain an entrance temperature of a heat exchanger of each heating indoor unit; a third obtaining module, configured to obtain a return air temperature of the heat exchanger of each heating indoor unit; and a control module, configured to control an operating status of the heating indoor unit according to the saturation temperature, the entrance temperature and the return air temperature.

With the cold-air-avoidance control apparatus of an indoor unit of a multi-split air conditioning system according to embodiments of the present disclosure, the saturation temperature corresponding to the high pressure of the outdoor unit, the entrance temperature and the return air temperature of the heat exchanger of the heating indoor unit are obtained by the first, second and third obtaining modules, the operating status of each heating indoor unit is controlled by the control module according to the above temperatures, thus increasing control reliability and accuracy of the heating indoor unit, improving the effect of the cold-air-avoidance control, and providing a more comfortable heating process.

Moreover, the cold-air-avoidance control apparatus of an indoor unit of a multi-split air conditioning system according to above embodiments of the present disclosure may have the following additional technical features.

Specifically, the operating status of the heating indoor unit includes a first operating status, a second operating status and a third operating status, in which, in the first operating status, a fan of the heating indoor unit is shut off; in the second operating status, the fan of the heating indoor unit operates at a first wind level, and an angle of an air outlet of the heating indoor unit is adjusted to an angle corresponding to a lower limit value of a size of the air outlet, in which a rotation rate of the fan corresponding to the first wind level is a minimal value of a plurality of rotation rates corresponding respectively to a plurality of wind levels; in the third operating status, the fan of the heating indoor unit operates at a preset wind level, and the angle of the air outlet of the heating indoor unit is adjusted to a preset angle.

Further, the control module is configured to control the operating status of the heating indoor unit to switch according to the saturation temperature, the entrance temperature, the return air temperature and a duration of a current operating status of the heating indoor unit.

Specifically, the control module is configured to: when the heating indoor unit is in the first operating status, if the heating indoor unit operates in the first operating status for a duration greater than or equal to a first time period, or the entrance temperature is higher than or equal to a first temperature threshold, or the saturation temperature is higher than or equal to a second temperature threshold, switch the operating status of the heating indoor unit to the second operating status; when the heating indoor unit is in the second operating status, if the heating indoor unit operates in the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, switch the operating status of the heating indoor unit to the third operating status; if the heating indoor unit operates in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, switch the operating status of the heating indoor unit to the first operating status; when the current operating status of the heating indoor unit is the third operating status, if the heating indoor unit operates in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, switch the operating status of the heating indoor unit to the second operating status.

To achieve the above objectives, embodiments according to a third aspect of the present disclosure provide a multi-split air conditioning system which includes the cold-air-avoidance control apparatus of an indoor unit of a multi-split air conditioning system according to embodiments of the second aspect of present disclosure.

With the multi-split air conditioning system according to embodiments of the present disclosure, reliability and accuracy of controlling the heating indoor unit are increased, the effect of the cold-air-avoidance control is improved, and a more comfortable heating process is provided.

DETAILED DESCRIPTION

Figure 1:
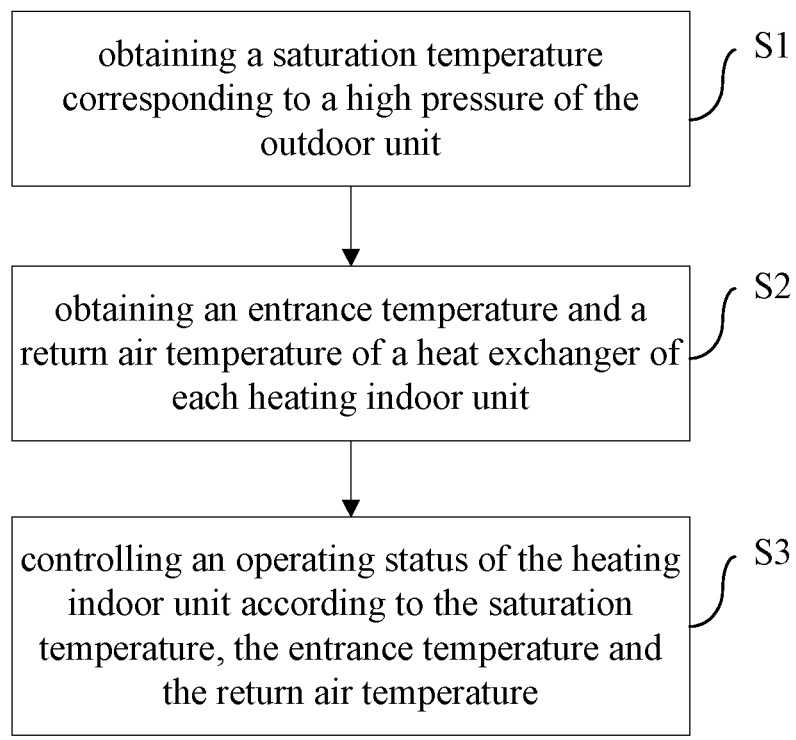
FIG. 1 is a flow chart illustrating a cold-air-avoidance control method of an indoor unit of a multi-split air conditioning system according to embodiments of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The multi-split air conditioning system and the cold-air-avoidance control method and apparatus of an indoor unit thereof according to embodiments of the present disclosure will now be illustrated with reference to accompanying drawing as follows.

FIG. 1 is a flow chart illustrating a cold-air-avoidance control method of an indoor unit of a multi-split air conditioning system according to embodiments of the present disclosure.

The multi-split air conditioning system according to embodiments of the present disclosure includes an outdoor unit and a plurality of indoor units.

As illustrated in FIG. 1, the cold-air-avoidance control method of an indoor unit of a multi-split air conditioning system according to embodiments of the present disclosure may include following acts.

At block S1, a saturation temperature corresponding to a high pressure of the outdoor unit is obtained.

At block S2, an entrance temperature and a return air temperature of a heat exchanger of each indoor unit in a heating mode (hereinafter referred to as a "heating indoor unit") are obtained.

The above saturation temperature, entrance temperature and return air temperature may be obtained by corresponding temperature sensors.

At block S3, an operating status of each heating indoor unit is controlled according to the saturation temperature, the entrance temperature and the return air temperature.

In an embodiment of the present disclosure, the operating status of the heating indoor unit includes a first operating status, a second operating status and a third operating status. Specifically, in the first operating status, a fan of the heating indoor unit is shut off. In the second operating status, the fan of the heating indoor unit operates at a first wind level, and an angle of an air outlet of the heating indoor unit is adjusted to an angle corresponding to a lower limit value of a size of the air outlet, in which a rotation rate of the fan corresponding to the first wind level is a minimal value of a plurality of rotation rates corresponding respectively to a plurality of wind levels. In the third operating status, the fan of the heating indoor unit operates at a preset wind level, and the angle of the air outlet of the heating indoor unit is adjusted to a preset angle. That is to say, the heating indoor unit does not output air in the first operating status, the heating indoor unit outputs air in a small flow rate in the second operating status, and the heating indoor unit outputs air according to a preset flow rate in the third operating status.

Specifically, the operating status of the heating indoor unit may be controlled to switch according to the saturation temperature, the entrance temperature, the return air temperature and a duration of a current operating status of the heating indoor unit.

Further, assuming that the heating indoor unit is in the first operating status, when the heating indoor unit has been in (operates in) the first operating status for a duration greater than or equal to a first time period, or the entrance temperature is higher than or equal to a first temperature threshold, or the saturation temperature is higher than or equal to a second temperature threshold, then the operating status of the heating indoor unit is switched to the second operating status. Assuming that the heating indoor unit is in the second operating status, when the heating indoor unit has been in the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, then the operating status of the heating indoor unit is switched to the third operating status; or when the heating indoor unit has been in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, then the operating status of the heating indoor unit is switched to the first operating status. Assuming that the heating indoor unit is in the third operating status, when the heating indoor unit has been in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, then the operating status of the heating indoor unit is switched to the second operating status.

It should be understood that, when determining that a temperature of air output by the heating indoor unit decreases, the output volume of the air may be decreased or turned off to prevent the cold air from blowing to a user; when determining that a temperature of air output by the heating indoor unit rises, the heating indoor unit may be controlled to perform heating operations by turning on or increasing the output volume of the air. Besides, in an embodiment of the present disclosure, the operating status of the heating indoor unit may be controlled to switch according to the duration of the current operating status, therefore the indoor air may be circulated every other certain time duration to obtain uniform indoor ambient temperature, thus avoiding a large difference between the indoor ambient temperatures and avoiding a situation that the fan is unable to be started due to a lower temperature around the heating indoor unit and a higher temperature at other space.

Specifically, assuming that the heating indoor unit does not output air, when the entrance temperature Ta is higher than or equal to the first temperature threshold A, or the saturation temperature Tc is higher than or equal to the second temperature threshold B, then it may be determined that the temperature of air output by the heating indoor unit rises, and the heating indoor unit may be controlled to turn on and begin to blow air. Since the temperature of air output by the heating indoor unit just starts to rise and has not reached a relatively higher temperature, the heating indoor unit may be controlled to output air in a low flow rate. When the heating indoor unit has not output air for a duration T1 greater than or equal to the first time period t1, the heating indoor unit may be controlled to turn on and begin to output air in a small flow rate to start the indoor air circulation.

Assuming that the heating indoor unit outputs air in the small flow rate, when the saturation temperature Tc is higher than or equal to the second temperature threshold B, or the return air temperature T is higher than or equal to the fourth temperature threshold C, then it may be determined that the temperature of air output by the heating indoor unit further rises, and the heating indoor unit may be controlled to increase the output volume of air and output air according to a corresponding preset flow rate of the heating indoor unit. Assuming that the heating indoor has been outputting air in the small flow rate for a duration T2 greater than or equal to the second time period t2 and the entrance temperature Ta is higher than or equal to the third temperature threshold A1, the heating indoor unit may be controlled to increase the output volume of air and output air according to the corresponding preset flow rate of the heating indoor unit to further the indoor air circulation.

Assuming that the heating indoor unit outputs air in the small flow rate, when the saturation temperature Tc is lower than or equal to the fifth temperature threshold E, the saturation temperature Tc is lower than the return air temperature T, the entrance temperature Ta is less than the difference (A−b) between the first temperature threshold and the first temperature difference value, and the heating indoor unit has been outputting air in the small flow rate for a duration T2 greater than or equal to the second time period t2, then it may be determined that the temperature of air output by the heating indoor unit decreases, the heating indoor unit may be controlled to turn off the output of air to temporarily control the indoor air to stop flowing up and circulating; if the saturation temperature Tc is lower than or equal to the fifth temperature threshold E, the return air temperature T is lower than the fourth temperature threshold C, the entrance temperature Ta is less than the difference (A−b) between the first temperature threshold and the first temperature difference value, and the heating indoor unit has been outputting air in the small flow rate for a duration T2 greater than or equal to the second time period t2, then it may be determined that the temperature of air output by the heating indoor unit decreases, the heating indoor unit may be controlled to shut off the output of air to temporarily control the indoor air to stop flowing up and circulating.

Assuming that the heating indoor unit outputs air in the preset flow rate, when the saturation temperature Tc is lower than or equal to the sixth temperature threshold D, the saturation temperature Tc is lower than the sum (T+a) of the return air temperature T and the first temperature sum value, the entrance temperature Ta is less than the first temperature threshold A, and the heating indoor unit has been outputting air in the preset flow rate for a duration T3 greater than or equal to the third time period t3, then it may be determined that the temperature of air output by the heating indoor unit decreases, the heating indoor unit may be controlled to turn off the output of air or output air in the small flow rate to temporarily reduce an intensity of flowing and circulating of the indoor air; when the saturation temperature Tc is lower than or equal to the sixth temperature threshold D, the return air temperature T is lower than the seventh temperature threshold C1, the entrance temperature Ta is less than the first temperature threshold A, and the heating indoor unit has been outputting air in the preset flow rate for a duration T3 greater than or equal to the third time period t3, then it may be determined that the temperature of air output by the heating indoor unit decreases the heating indoor unit may be controlled to shut off the output of air or output air in the small flow rate to temporarily reduce an intensity of flowing and circulating of the indoor air.

The above first to seventh temperature thresholds, the first temperature difference value, the first temperature sum value and the first to third time periods may be set according to performance parameters of the multi-split air conditioning system and specific requirements for the effect of cold-air-avoidance.

With the cold-air-avoidance control method of an indoor unit of a multi-split air conditioning system according to embodiments of the present disclosure, the saturation temperature corresponding to the high pressure of the outdoor unit, the entrance temperature and the return air temperature of the heat exchanger of the heating indoor unit are obtained, the operating status of each heating indoor unit is controlled according to the above temperatures, thus increasing reliability and accuracy of controlling the heating indoor unit, improving the effect of the cold-air-avoidance control, and providing a more comfortable heating process.

To implement the cold-air-avoidance control method of an indoor unit of a multi-split air conditioning system according to above embodiments, the present disclosure further provides a cold-air-avoidance control apparatus of an indoor unit of a multi-split air conditioning system.

The multi-split air conditioning system according to embodiments of the present disclosure includes an outdoor unit and a plurality of indoor units.

Figure 2:
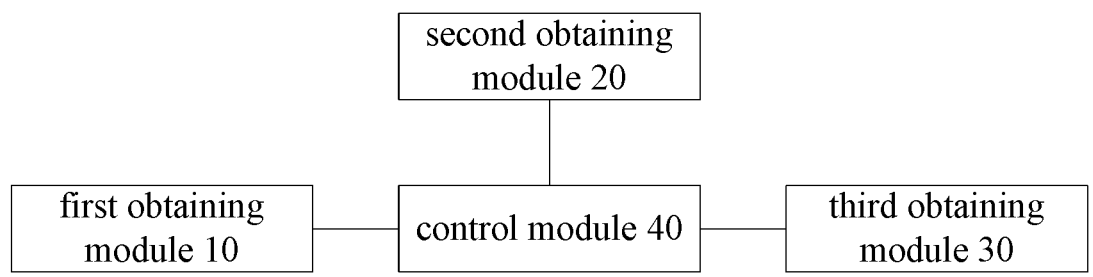
FIG. 2 is a block diagram of a cold-air-avoidance control apparatus of an indoor unit of a multi-split air conditioning system according to embodiments of the present disclosure.

As illustrated in FIG. 2, the cold-air-avoidance control apparatus of an indoor unit of a multi-split air conditioning system according to embodiments of the present disclosure may include a first obtaining module 10, a second obtaining module 20, a third obtaining module 30 and a control module 40.

Specifically, the first obtaining module 10 is configured to obtain a saturation temperature corresponding to a high pressure of the outdoor unit, the second obtaining module 20 is configured to obtain an entrance temperature of a heat exchanger of each heating indoor unit, the third obtaining module 30 is configured to obtain a return air temperature of the heat exchanger of each heating indoor unit. The control module 40 is configured to control an operating status of the heating indoor unit according to the saturation temperature, the entrance temperature and the return air temperature.

Each of the first obtaining module 10, the second obtaining module 20, the third obtaining module 30 and the control module 40 may have a temperature sensor.

In an embodiment of the present disclosure, the operating status of the heating indoor unit includes a first operating status, a second operating status and a third operating status. Specifically, in the first operating status, a fan of the heating indoor unit is shut off. In the second operating status, the fan of the heating indoor unit operates at a first wind level, and an angle of an air outlet of the heating indoor unit is adjusted to an angle corresponding to a lower limit value of a size of the air outlet, in which a rotation rate of the fan corresponding to the first wind level is a minimal value of a plurality of rotation rates corresponding respectively to a plurality of wind levels. In the third operating status, the fan of the heating indoor unit operates at a preset wind level, and the angle of the air outlet of the heating indoor unit is adjusted to a preset angle. That is to say, in the first operating status, the heating indoor unit does not output air, in the second operating status, the heating indoor unit outputs air in a small flow rate, and in the third operating status, the heating indoor unit outputs air according to a preset flow rate.

Specifically, the control module 40 may be configured to control the operating status of the heating indoor unit to switch according to the saturation temperature, the entrance temperature, the return air temperature and a duration of a current operating status of the heating indoor unit.

Further, the control module 40 may be configured to: when the current operating status of the heating indoor unit is the first operating status, if the heating indoor unit operates in the first operating status for a duration greater than or equal to a first time period, or the entrance temperature is greater than or equal to a first temperature threshold, or the saturation temperature is greater than or equal to a second temperature threshold, the operating status of the heating indoor unit is switched to the second operating status. When the current operating status of the heating indoor unit is the second operating status, if the heating indoor unit operates the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, then the operating status of the heating indoor unit is switched to the third operating status; if the heating indoor unit operates in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, then the operating status of the heating indoor unit is switched to the first operating status. When the current operating status of the heating indoor unit is the third operating status, if the heating indoor unit operates in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, then the operating status of the heating indoor unit is switched to the second operating status.

It should be understood that when the control module 40 determines that a temperature of air output by the heating indoor unit decreases, the output volume of air may be decreased or turned off to prevent cold air from blowing to a user; when the control module 40 determines that a temperature of air output by the heating indoor unit rises, the heating indoor unit may be controlled to perform heating operations by turning on or increasing the output volume of air. Besides, in an embodiment of the present disclosure, the control module 40 may further control the operating status of the heating indoor unit to switch according to the duration of the current operating status, therefore indoor air may be circulated every other certain time duration to obtain uniform indoor ambient temperature, thus avoiding a large temperature difference between the indoor ambient temperatures and preventing the fan from being disabled due to a lower temperature around the heating indoor unit and a higher temperature at other positions.

Specifically, when the heating indoor unit does not output air, if the entrance temperature Ta is higher than or equal to the first temperature threshold A, or the saturation temperature Tc is higher than or equal to the second temperature threshold B, then it may be determined by the control module 40 that the temperature of air output by the heating indoor unit rises, and the heating indoor unit may be controlled to turn on and begin to blow air. Since the temperature of air output by the heating indoor unit just starts to rise and has not reached a relatively higher temperature, the heating indoor unit may be controlled to output air in a small flow rate. When the heating indoor has not output air for a duration T1 greater than or equal to the first time period t1, the heating indoor unit may be controlled by the control module 40 to turn on and begin to output air in a small flow rate to further the indoor air flow circulation.

Assuming that the heating indoor unit outputs air in the small flow rate, when the saturation temperature Tc is higher than or equal to the second temperature threshold B, or the return air temperature T is higher than or equal to the fourth temperature threshold C, then it may be determined by the control module 40 that the temperature of air output by the heating indoor unit further rises, and the heating indoor unit may be controlled to increase the output volume of air and output air according to a corresponding preset flow rate of the heating indoor unit. When the heating indoor has been outputting air in the small flow rate for a duration T2 greater than or equal to the second time period t2 and the entrance temperature Ta is higher than or equal to the third temperature A1, the heating indoor unit may be controlled by the control module 40 to increase the output volume of air and output air according to the corresponding preset flow rate of the heating indoor unit to further the indoor air circulation.

Assuming that the heating indoor unit outputs air in the small flow rate, when the saturation temperature Tc is lower than or equal to the fifth temperature threshold E, the saturation temperature Tc is lower than the return air temperature T, the entrance temperature Ta is less than the difference (A−b) between the first temperature threshold and the first temperature difference value, and the heating indoor unit has been outputting air in the small flow rate for a duration T2 greater than or equal to the second time period t2, then the control module 40 may determine that the temperature of air output by the heating indoor unit decreases and control the heating indoor unit to turn off the output of air to temporarily control the indoor air to stop flowing up and circulating; if the saturation temperature Tc is lower than or equal to the fifth temperature threshold E, the return air temperature T is lower than the fourth temperature threshold C, the entrance temperature Ta is less than the difference (A−b) between the first temperature threshold and the first temperature difference value, and the heating indoor unit has been outputting air in the small flow rate for a duration T2 greater than or equal to the second time period t2, then the control module 40 may determine that the temperature of air output by the heating indoor unit decreases and control the heating indoor unit to turn off the output of air to temporarily control the indoor air to stop flowing up and circulating.

Assuming that the heating indoor unit outputs air in the preset flow rate, when the saturation temperature Tc is lower than or equal to the sixth temperature threshold D, the saturation temperature Tc is lower than the sum (T+a) of the return air temperature T and the first temperature sum value, the entrance temperature Ta is less than the first temperature threshold A, and the heating indoor unit has been outputting air in the preset flow rate for a duration T3 greater than or equal to the third time period t3, then the control module 40 may determine that the temperature of air output by the heating indoor unit decreases and control the heating indoor unit to turn off the output of air or output air in the small flow rate to temporarily reduce an intensity of flowing and circulating of the indoor air; if the saturation temperature Tc is lower than or equal to the sixth temperature threshold D, the return air temperature T is lower than the seventh temperature threshold C1, the entrance temperature Ta is less than the first temperature threshold A, and the heating indoor unit has been outputting air in the preset flow rate for a duration T3 greater than or equal to the third time period t3, then the control module 40 may determine that the temperature of air output by the heating indoor unit decreases and control the heating indoor unit to turn off the output of air or output air in the small flow rate to temporarily reduce an intensity of flowing and circulating of the indoor air.

The above first to seventh temperature thresholds, the first temperature difference value, the first temperature sum value and the first to third time periods may be set according to performance parameters of the multi-split air conditioning system and specific requirements for the effect of cold-air-avoidance.

With the cold-air-avoidance control apparatus of an indoor unit of a multi-split air conditioning system according to embodiments of the present disclosure, the saturation temperature corresponding to the high pressure of the outdoor unit, the entrance temperature and the return air temperature of the heat exchanger of the heating indoor are obtained by the first to third obtaining modules, the operating status of each heating indoor unit is controlled by the control module according to the above temperatures, thus increasing reliability and accuracy of controlling the heating indoor unit, improving the effect of the cold-air-avoidance control, and providing a more comfortable heating process.

Corresponding to above embodiments, the present disclosure further provides a multi-split air conditioning system, the multi-split air conditioning system includes the cold-air-avoidance control apparatus of an indoor unit of a multi-split air conditioning system according to above embodiments of the present disclosure.

With the multi-split air conditioning system according to embodiments of the present disclosure, reliability and accuracy of controlling the heating indoor unit are increased, the effect of the cold-air-avoidance control is improved, and a more comfortable heating process is provided.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, unless specifically and particularly prescribed otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, or interactions of two elements, unless specified otherwise. The particular meanings of above terms can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of the present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A cold-air-avoidance control method of an indoor unit of a multi-split air conditioning system, wherein, the multi-split air conditioning system comprises an outdoor unit and a plurality of indoor units, and the method comprises:
   obtaining a saturation temperature corresponding to a pressure of the outdoor unit;
   obtaining an entrance temperature and a return air temperature of a heat exchanger of each heating indoor unit; and
   controlling an operating status of the heating indoor unit according to the saturation temperature, the entrance temperature and the return air temperature, wherein, the operating status of the heating indoor unit includes a first operating status, a second operating status and a third operating status, wherein,
   in the first operating status, a fan of the heating indoor unit is shut off;
   in the second operating status, the fan of the heating indoor unit operates at a first wind level, and a rotation rate of the fan corresponding to the first wind level is a minimal value of a plurality of rotation rates corresponding respectively to a plurality of wind levels;
   in the third operating status, the fan of the heating indoor unit operates at a preset wind level, and the angle of the air outlet of the heating indoor unit is adjusted to a preset angle, wherein, the operation of controlling an operating status of the heating indoor unit according to the saturation temperature, the entrance temperature and the return air temperature comprises:

controlling the operating status of the heating indoor unit to switch according to the saturation temperature, the entrance temperature, the return air temperature and a duration of a current operating status of the heating indoor unit, wherein the current operating status of the heating indoor unit is the first operating status, and the operation of controlling the operating status of the heating indoor unit to switch according to the saturation temperature, the entrance temperature, the return air temperature and a duration of a current operating status of the heating indoor unit comprises:

when the heating indoor unit operates in the first operating status for a duration greater than or equal to a first time period, or the entrance temperature is higher than or equal to a first temperature threshold, or the saturation temperature is higher than or equal to a second temperature threshold, switching the operating status of the heating indoor unit to the second operating status.

2. A cold-air-avoidance control method of an indoor unit of a multi-split air conditioning system, wherein, the multi-split air conditioning system comprises an outdoor unit and a plurality of indoor units, and the method comprises:

obtaining a saturation temperature corresponding to a pressure of the outdoor unit;

obtaining an entrance temperature and a return air temperature of a heat exchanger of each heating indoor unit; and controlling an operating status of the heating indoor unit according to the saturation temperature, the entrance temperature and the return air temperature, wherein, the operating status of the heating indoor unit includes a first operating status, a second operating status and a third operating status, wherein, in the first operating status, a fan of the heating indoor unit is shut off;

in the second operating status, the fan of the heating indoor unit operates at a first wind level, and a rotation rate of the fan corresponding to the first wind level is a minimal value of a plurality of rotation rates corresponding respectively to a plurality of wind levels;

in the third operating status, the fan of the heating indoor unit operates at a preset wind level, and the angle of the air outlet of the heating indoor unit is adjusted to a preset angle, wherein, the operation of controlling an operating status of the heating indoor unit according to the saturation temperature, the entrance temperature and the return air temperature comprises: controlling the operating status of the heating indoor unit to switch according to the saturation temperature, the entrance temperature, the return air temperature and a duration of a current operating status of the heating indoor unit, wherein the current operating status of the heating indoor unit is the second operating status, and the operation of controlling the operating status of the heating indoor unit to switch according to the saturation temperature, the entrance temperature, the return air temperature and a duration of a current operating status of the heating indoor unit comprises:

when the heating indoor unit operates in the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, switching the operating status of the heating indoor unit to the third operating status;

when the heating indoor unit operates in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, switching the operating status of the heating indoor unit to the first operating status.

3. A cold-air-avoidance control method of an indoor unit of a multi-split air conditioning system, wherein, the multi-split air conditioning system comprises an outdoor unit and a plurality of indoor units, and the method comprises:

obtaining a saturation temperature corresponding to a pressure of the outdoor unit;

obtaining an entrance temperature and a return air temperature of a heat exchanger of each heating indoor unit; and controlling an operating status of the heating indoor unit according to the saturation temperature, the entrance temperature and the return air temperature, wherein, the operating status of the heating indoor unit includes a first operating status, a second operating status and a third operating status, wherein, in the first operating status, a fan of the heating indoor unit is shut off;

in the second operating status, the fan of the heating indoor unit operates at a first wind level, and a rotation rate of the fan corresponding to the first wind level is a minimal value of a plurality of rotation rates corresponding respectively to a plurality of wind levels;

in the third operating status, the fan of the heating indoor unit operates at a preset wind level, and the angle of the air outlet of the heating indoor unit is adjusted to a preset angle, wherein, the operation of controlling an operating status of the heating indoor unit according to the saturation temperature, the entrance temperature and the return air temperature comprises:

controlling the operating status of the heating indoor unit to switch according to the saturation temperature, the entrance temperature, the return air temperature and a duration of a current operating status of the heating indoor unit, wherein the current operating status of the heating indoor unit is the third operating status, and the operation of controlling the operating status of the heating indoor unit to switch according to the saturation temperature, the entrance temperature, the return air temperature and a duration of a current operating status of the heating indoor unit comprises:

the heating indoor unit operates in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, switching the operating status of the heating indoor unit to the second operating status.

4. A cold-air-avoidance control apparatus of an indoor unit of a multi-split air conditioning system, wherein, the multi-split air conditioning system comprises an outdoor unit and a plurality of indoor units, and the apparatus comprises:

- a first obtaining module, configured to obtain a saturation temperature corresponding to a pressure of the outdoor unit;
- a second obtaining module, configured to obtain an entrance temperature of a heat exchanger of each heating indoor unit;
- a third obtaining module, configured to obtain a return air temperature of the heat exchanger of each heating indoor unit; and
- a control module, configured to control an operating status of the heating indoor unit according to the saturation temperature, the entrance temperature and the return air temperature wherein, the operating status of the heating indoor unit includes a first operating status, a second operating status and a third operating status, wherein,
- in the first operating status, a fan of the heating indoor unit is shut off;
- in the second operating status, the fan of the heating indoor unit operates at a first wind level, and a rotation rate of the fan corresponding to the first wind level is a minimal value of a plurality of rotation rates corresponding respectively to a plurality of wind levels;
- in the third operating status, the fan of the heating indoor unit operates at a preset wind level, and the angle of the air outlet of the heating indoor unit is adjusted to a preset angle, wherein, the operation of controlling an operating status of the heating indoor unit according to the saturation temperature, the entrance temperature and the return air temperature comprises:
- controlling the operating status of the heating indoor unit to switch according to the saturation temperature, the entrance temperature, the return air temperature and a duration of a current operating status of the heating indoor unit,
- wherein the current operating status of the heating indoor unit is the first operating status, and the operation of controlling the operating status of the heating indoor unit to switch according to the saturation temperature, the entrance temperature, the return air temperature and a duration of a current operating status of the heating indoor unit comprises:
- when the heating indoor unit operates in the first operating status for a duration greater than or equal to a first time period, or the entrance temperature is higher than or equal to a first temperature threshold, or the saturation temperature is higher than or equal to a second temperature threshold, switching the operating status of the heating indoor unit to the second operating status.

5. The apparatus according to claim 4, wherein, the control module is configured to control the operating status of the heating indoor unit to switch according to the saturation temperature, the entrance temperature, the return air temperature and a duration of a current operating status of the heating indoor unit.

6. A multi-split air conditioning system, comprising the cold-air-avoidance control apparatus of an indoor unit of a multi-split air conditioning system according to claim 4.

7. A cold-air-avoidance control apparatus of an indoor unit of a multi-split air conditioning system, wherein, the multi-split air conditioning system comprises an outdoor unit and a plurality of indoor units, and the apparatus comprises:

- a first obtaining module, configured to obtain a saturation temperature corresponding to a pressure of the outdoor unit;
- a second obtaining module, configured to obtain an entrance temperature of a heat exchanger of each heating indoor unit;
- a third obtaining module, configured to obtain a return air temperature of the heat exchanger of each heating indoor unit; and
- a control module, configured to control an operating status of the heating indoor unit according to the saturation temperature, the entrance temperature and the return air and a duration of a current operating status of the heating indoor unit, wherein, the operating status of the heating indoor unit includes a first operating status, a second operating status and a third operating status, wherein,
- in the first operating status, a fan of the heating indoor unit is shut off;
- in the second operating status, the fan of the heating indoor unit operates at a first wind level, and a rotation rate of the fan corresponding to the first wind level is a minimal value of a plurality of rotation rates corresponding respectively to a plurality of wind levels;
- in the third operating status, the fan of the heating indoor unit operates at a preset wind level, and the angle of the air outlet of the heating indoor unit is adjusted to a preset angle, wherein, the operation of controlling an operating status of the heating indoor unit according to the saturation temperature, the entrance temperature and the return air temperature comprises: controlling the operating status of the heating indoor unit to switch according to the saturation temperature, the entrance temperature, the return air temperature and a duration of a current operating status of the heating indoor unit, wherein the current operating status of the heating indoor unit is the second operating status, and the operation of controlling the operating status of the heating indoor unit to switch according to the saturation temperature, the entrance temperature, the return air temperature and a duration of a current operating status of the heating indoor unit comprises:
- when the heating indoor unit operates in the second operating status for a duration greater than or equal to a second time period and the entrance temperature is higher than or equal to a third temperature threshold, or the saturation temperature is higher than or equal to the second temperature threshold, or the return air temperature is higher than or equal to a fourth temperature threshold, switching the operating status of the heating indoor unit to the third operating status;
- when the heating indoor unit operates in the second operating status for a duration greater than or equal to the second time period and the saturation temperature is lower than or equal to a fifth temperature threshold, and the saturation temperature is lower than the return air temperature or the return air temperature is lower than the fourth temperature threshold, and the entrance temperature is less than a difference between the first temperature threshold and a first temperature difference value, switching the operating status of the heating indoor unit to the first operating status.

8. A cold-air-avoidance control apparatus of an indoor unit of a multi-split air conditioning system, wherein, the multi-split air conditioning system comprises an outdoor unit and a plurality of indoor units, and the apparatus comprises:

a first obtaining module, configured to obtain a saturation temperature corresponding to a pressure of the outdoor unit;

a second obtaining module, configured to obtain an entrance temperature of a heat exchanger of each heating indoor unit;

a third obtaining module, configured to obtain a return air temperature of the heat exchanger of each heating indoor unit; and a control module, configured to control an operating status of the heating indoor unit according to the saturation temperature, the entrance temperature, the return air temperature and a duration of a current operating status of the heating indoor unit, wherein the current operating status of the heating indoor unit is the third operating status, and the operation of controlling the operating status of the heating indoor unit to switch according to the saturation temperature, the entrance temperature, the return air temperature and a duration of a current operating status of the heating indoor unit comprises:

the heating indoor unit operates in the third operating status for a duration greater than or equal to a third time period and the saturation temperature is lower than or equal to a sixth temperature threshold, and the saturation temperature is less than a sum of the return air temperature and a first temperature sum value or the return air temperature is lower than a seventh temperature threshold, and the entrance temperature is lower than the first temperature threshold, switching the operating status of the heating indoor unit to the second operating status.

* * * * *